Jan. 22, 1957

J. W. MONEY 2,778,323

CRUMBLES ADAPTOR FOR PELLET MACHINE

Filed July 22, 1953

INVENTOR.
JOHN W. MONEY
BY
Ely, Frye & Hamilton
ATTYS.

INVENTOR.
JOHN W. MONEY
BY Ely, Frye & Hamilton
ATTYS.

United States Patent Office 2,778,323
Patented Jan. 22, 1957

2,778,323

CRUMBLES ADAPTOR FOR PELLET MACHINE

John W. Money, Akron, Ohio, assignor to The Quaker Oats Company, Chicago, Ill., a corporation of New Jersey Application July 22, 1953, Serial No. 369,694

9 Claims. (Cl. 107—14)

The invention relates generally to pellet machines for producing pellets of stock feed mixtures, and more particularly to an adaptor for chopping or cutting the pellets into smaller fragments suitable for feeding to young fowl, such fragments being ordinarily called crumbles.

The type of pellet machine to which the present improvement is applied is shown in United States Patent No. 2,241,546, issued May 13, 1941, to Sydney T. Evenstad et al. In this machine the mash material is impacted and forced radially outward through a ring die having rows of orifices, and as the columns of material emerge rotating blades or knives shear them off into pellets. The cross sectional area of the pellets is determined by the size of the die orifices, and the length is determined by the frequency of rotation of the cutter knives. An average size of such pellets is about ¼ inch in diameter and ¼ to ½ inch long.

For reducing the pellets into smaller fragments known as crumbles, it is common practice to put the pellets through grinding rolls of well known construction, but this requires an additional operation and produces a high percentage of fines.

It is an object of the present invention to provide an adaptor for a pellet machine which will produce the crumbles directly without requiring an additional operation.

Another object is to provide an adaptor for a pellet machine which will produce crumbles with a minimum amount of fines.

A further object is to provide an inexpensive crumble-producing adaptor which is easily embodied in a pellet machine without requiring extensive changes.

These and other objects are accomplished by the improvements, constructions and arrangements comprising the present invention, a preferred embodiment of which is shown by way of example in the accompanying drawings and described in detail herein. Various modifications and changes in details of construction may be made without departing from the scope of the invention as defined in the appended claims.

Figure 1:
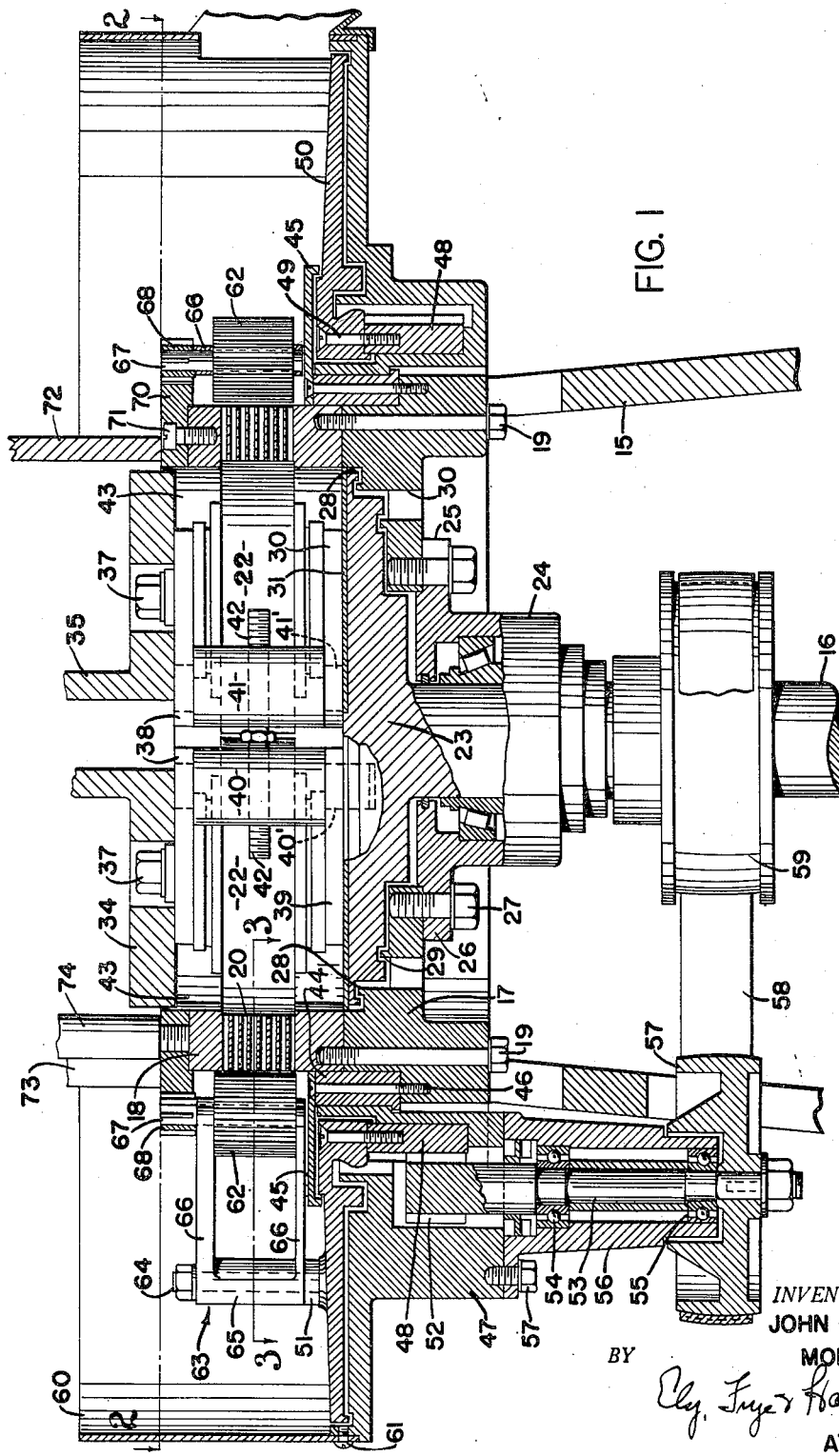
Fig. 1 is a fragmentary vertical sectional view of a pellet machine embodying the present adaptor.

The pellet machine to which the present adaptor is applied is shown and described in detail in the said Patent No. 2,241,546. For the purpose of the present invention that part of the machine shown in Figs. 1 and 2 includes a circular housing member 15 supported on a suitable base (not shown), and a drive shaft 16 journaled in the base extends vertically upward through the housing. The top 17 of the housing forms a support for the ring die 18 which is secured to the housing by bolts 19. The ring die has rows of radially disposed orifices 20 extending therethrough, and in Fig. 1 eight vertically spaced rows are shown, although the number may be varied as desired. The size of the orifices 20 determines the cross sectional area of the pellets. The inner face of the ring die 18 is provided with an annular recess which receives and guides the outer peripheries of the impacting rollers 22 which roll around the inside of the ring die.

The drive shaft 16 has a top annular flange 23, and under the flange is a shaft bearing 24 having an annular flange 25 secured to the inner annular housing flange 26 by bolts 27. Between the underside of flange 23 and the top 17 of the housing are provided seals 28 and 29, and breather holes 30 are provided through housing portion 17 to permit the escape of any mash which might pass the cover plate 31 and seal 28.

The impactor unit is carried on drive shaft flange 23 by a pair of studs 33 which are screw threaded at their lower ends into flange 23, the upper ends being secured to the flanged bottom 34 of a feeder cone 35 for passing an even flow of mash from a mixer unit (not shown). The impacting rollers 22 are rotatably mounted by suitable anti-friction bearings on vertical pins 36 having nuts 37 on their upper ends, and the rollers are positioned between top cover plates 38 and bottom cover plates 39.

The plates 38 and 39 have pairs of hinge pins 40 and 41 journaled in their opposite ends and the lower ends 40' and 41' of the pins project into holes in the drive shaft flange 23 to provide drive studs for the impacting unit. Adjustment screws 42 are provided for adjusting the impacting rollers 22 with respect to each other and to the die ring 18. These screws 42 have right and left threads screwed through the respective pins 40 and 41. The space between the top and bottom cover plates 38 and 39 and around the impacting rollers 22 provides a mash receiving and impacting chamber 43 within the die 18.

A die centering ring 44 surrounds the die ring 18 and rests on an annular shoulder on the housing portion 17, and a stationary pellet receiving platform 45 is secured to the ring 44 by screws 46 which also secure the ring 44 to the housing portion 17. An annular ring gear housing 47 is mounted on an annular shoulder on the ring 44, and a ring gear 48 is rotatably supported on said ring 47. The ring gear 48 is secured by screws 49 to a horizontally disposed conveyor plate 50 having circumferentially spaced mounting posts 51 on its upper surface. A pinion gear 52 meshes with the teeth of ring gear 48 for driving the same, the pinion shaft 53 being journaled in bearings 54 and 55 housed in sleeve 56 which is secured to housing ring 47 by screws 57. The lower end of pinion shaft 53 has a pulley 57 thereon which is driven by a belt 58 from a pulley 59 on the drive shaft 16.

Thus, as the ring gear 48 is rotated by the pinion 52, the platform 50 is rotated above the upper surface of gear housing 47 and within the outer annular wall 60 secured thereon by screws 61.

In the operation of the machine thus far described for making pellets from the impacted rods or columns of feed mixture forced out through the orifices 20 in the die ring, a plurality of shearing blades may be mounted one on each mounting post 51 in accordance with Patent No. 2,241,546, the blades being adapted to shear the columns of feed mixture into pellets.

Figure 2:
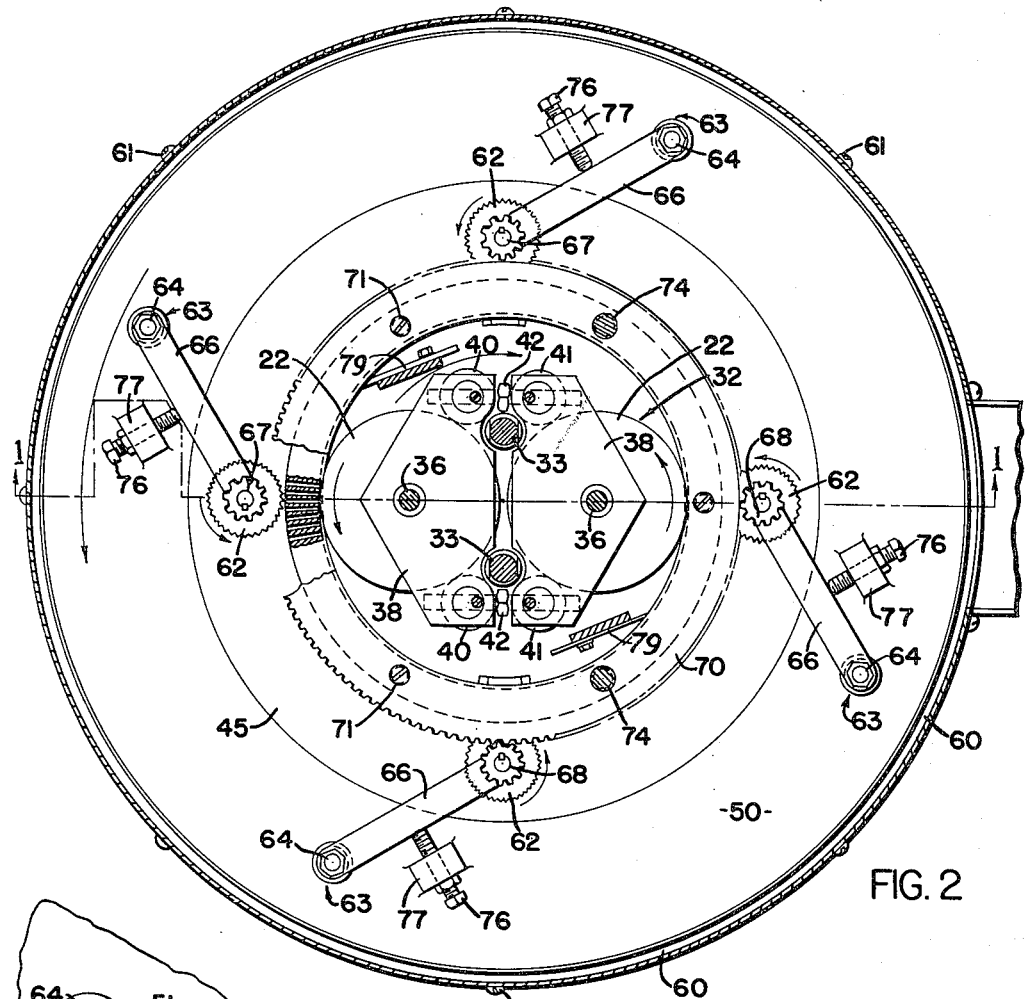
Fig. 2 is a plan view thereof.

In accordance with the present invention rotary grooved or corrugated cutting wheels 62 are mounted in bracket yokes 63 which are supported on the mounting posts by bolts 64. While four cutting wheels 62 mounted on four equally spaced posts are shown in Fig. 2, it is within the scope of the present invention to provide any desired number of mounting posts for a corresponding numbers of cutters.

Figure 3:
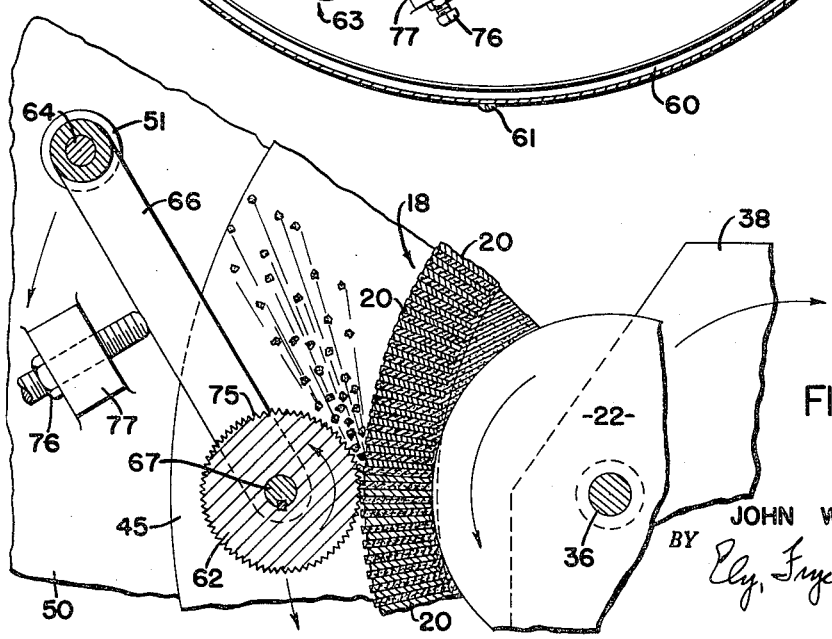
Fig. 3 is an enlarged fragmentary plan view showing how the pellets are cut into crumbles as they emerge from the ring die.

Each bracket yoke 63 preferably includes a sleeve 65 journaled on bolt 64 and having arms 66 projecting horizontally therefrom. A vertical cutter shaft 67 is journaled in the outer ends of the arms and the cutter wheel is keyed on the shaft as indicated in Fig. 3. The upper end of each shaft 67 projects above the cutter wheel and has a pinion 68 keyed thereon. The pinions 68 mesh with the teeth of an upper ring gear 70 which is secured on the top of ring die 18 by screw studs 71. Portions 72 and 73 of the mixer unit housing are supported on said ring gear 70, and the housing is secured to said ring gear at spaced intervals by studs 74.

The outer surfaces of the cutter wheels are provided with vertical sharp edged ribs 75 forming a saw tooth pattern around their entire peripheries. The size of the pinions 68 in proportion to the diameters of the cutter wheels is calculated so that the peripheral speed of the cutter is approximately two and one half times that of the orbital speed of the cutter wheel as driven by the conveyor plate 50. In other words, the speed of the outer edges of the cutting ribs 75 is about two and one-half times faster than if the wheels were rotated by rolling on the ring die 18. This increased peripheral speed is very important in order to produce the proper cutting action upon the extruded rods by the cutting wheels. The cutter wheels preferably are adjusted to provide a slight clearance between the outer edges of the teeth 75 and the outer surface of the die, and good results are obtained when this clearance is about $\frac{1}{16}$ inch. Means for adjusting the clearance preferably includes adjusting screws 76 threaded through lugs 77 on the conveyor platform 50 and abutting the brackets 63, each of which are angularly inclined to a radius of the die.

In the operation of the improved machine, as the mash feed is fed through the feeding cone 35 into the impacting chamber 43, the impacting unit is rotated by the drive shaft in a clockwise direction, causing the rollers 22 to rotate in the opposite direction as they roll over the inner circumference of the die ring 18, a pair of flexible guide plates 79 corresponding to the plates 260 of said Patent No. 2,241,546 being secured to cone 35 to wipe over the inner faces of the die orifices ahead of rollers 22. As shown in Fig. 3, the rollers extrude the impacted feed mix M through the orifices 20 in the form of rods or columns M' and as they emerge they are struck by the rapidly rotating cutter wheels and chopped into fragments of the size known in the trade as crumbles, which are thrown outwardly by centrifugal force onto the conveyor plate 50 which carries the crumbles around to the outlet opening 80 in the wall 60. The speed of the conveyor plate 50 and consequently the orbital speed of the cutter wheels is preferably varied from about 60 to 110 R. P. M.

From the foregoing, it will be apparent that an improved means has been provided for economically adapting a pellet machine of known construction into a form for making crumbles, and that the improvement is such that the machine may be changed from a pellet machine to a crumbles machine and back again, with little trouble and expense. No additional grinding operation is needed to produce the crumbles, and a very low percentage of fines is obtained as compared with the usual operation of grinding the pellets into crumbles.

What is claimed is:

1. In a pellet machine having a perforated die ring, an impactor unit rotatable within said die to extrude feed mix therethrough, and a rotatable conveyor plate outside of the die to receive the extruded feed mix, an adaptor for cutting said feed mix into fragments of crumble size, said adaptor comprising a ring gear secured on said die ring, a series of circumferentially spaced corrugated cutter wheels carried on said conveyor plate adjacent the outer surface of said die ring, and pinions on said cutter wheels meshing with said ring gear for driving the cutter wheels as the conveyor plate is rotated, said pinions being so constructed and arranged as to drive said cutter wheels at peripheral speeds approximately two and one-half times their orbital speed.

2. In a pellet machine having a perforated die ring, an impactor unit rotatable within said die to extrude feed mix therethrough, and a rotatable conveyor plate outside of the die to receive the extruded feed mix, an adaptor for cutting said feed mix into fragments of crumble size, said adaptor comprising a ring gear secured on said die ring, a series of circumferentially spaced cutter wheels mounted on vertical shafts on said conveyor plate adjacent the outer surface of said die ring, said cutter wheels having a series of sharp-edged vertical ribs on their outer peripheries, and pinions secured on said cutter wheel shafts and meshing with said ring gear for driving the cutter wheels as the conveyor plate is rotated.

3. In a pellet machine having a perforated die ring, an impactor unit rotatable within said die to extrude feed mix therethrough, and a rotatable conveyor plate outside of the die to receive the extruded feed mix, an adaptor for cutting said feed mix into fragments of crumble size, said adaptor comprising a ring gear secured on said die ring, a series of circumferentially spaced cutter wheels mounted on vertical shafts on said conveyor plate adjacent the outer surface of said die ring, said cutter wheels having a series of sharp-edged vertical ribs on their outer peripheries, and pinions secured on said cutter wheel shafts and meshing with said ring gear for driving the cutter wheels as the conveyor plate is rotated, said pinions being so constructed and arranged as to drive the cutter wheels at peripheral speeds approximately two and one-half times their orbital speed.

4. In a pellet machine having a perforated die ring, an impactor unit rotatable within said die to extrude feed mix therethrough, and a rotatable conveyor plate outside of the die to receive the extruded feed mix, an adaptor for cutting said feed mix into fragments of crumble size, said adaptor comprising a ring gear secured on said die ring, a series of circumferentially spaced corrugated cutter wheels carried on said conveyor plate adjacent the outer surface of said die ring, means for adjusting the position of each cutter wheel relative to said die ring, and pinions on said cutter wheels meshing with said ring gear for driving the cutter wheels as the conveyor plate is rotated, said pinions being so constructed and arranged as to drive said cutter wheels at peripheral speeds approximately two and one-half times their orbital speed.

5. In a pellet machine having a perforated die ring, an impactor unit rotatable within said die to extrude feed mix therethrough, and a rotatable conveyor plate outside of the die to receive the extruded feed mix, an adaptor for cutting said feed mix into fragments of crumble size, said adaptor comprising a ring gear secured on said die ring, a series of circumferentially spaced cutter wheels mounted on vertical shafts on said conveyor plate adjacent the outer surface of said die ring, said cutter wheels having a series of sharp-edged vertical ribs on their outer peripheries, means for adjusting the position of each cutter wheel relative to said die ring, and pinions secured on said cutter wheel shafts and meshing with said ring gear for driving the cutter wheels as the conveyor plate is rotated.

6. In a pellet machine having a perforated die ring, an impactor unit rotatable within said die to extrude feed mix therethrough, and a rotatable conveyor plate outside of the die to receive the extruded feed mix, an adaptor for cutting said feed mix into fragments of crumble size, said adaptor comprising a ring gear secured on said die ring, a series of circumferentially spaced cutter wheels mounted on vertical shafts on said conveyor plate adjacent the outer surface of said die ring, said cutter wheels having a series of sharp-edged vertical ribs on their outer peripheries, means for adjusting the position of each cutter wheel relative to said die ring, and pinions secured on said cutter wheel shafts and meshing with said ring gear for driving the cutter wheels as the conveyor plate is rotated, said pinions being so constructed and arranged as to drive the cutter wheels at peripheral speeds approximately two and one-half times their orbital speed.

7. In a pellet machine having a perforated die ring, an impactor unit rotatable within said die to extrude feed mix therethrough, and a rotatable conveyor plate outside of the die to receive the extruded feed mix, an adaptor for cutting said feed mix into fragments of crumble size, said adaptor comprising a ring gear secured on said die ring, a series of cutter wheels adjacent to the outer surface of said die, a bracket for each cutter wheel mounted on said conveyor plate, a shaft in each cutter wheel journaled in said bracket, and a pinion on each shaft meshing with said ring gear for driving the cutter wheels as the conveyor plate is rotated, said pinions being so constructed and arranged as to drive said cutter wheels at peripheral speeds approximately two and one-half times their orbital speed.

8. In a pellet machine having a perforated die ring, an impactor unit rotatable within said die to extrude feed mix therethrough, and a rotatable conveyor plate outside of the die to receive the extruded feed mix, an adaptor for cutting said feed mix into fragments of crumble size, said adaptor comprising a ring gear secured on said die ring, a series of cutter wheels adjacent to the outer surface of said die, a bracket for each cutter wheel rotatably mounted at one end on said conveyor plate in a position inclined to a radius of the die, means for adjusting the inclination of said bracket, a shaft in each cutter wheel journaled in the other end of said bracket, and a pinion on each shaft meshing with said ring gear for driving the cutter wheels as the conveyor plate is rotated.

9. In a pellet machine having a perforated die ring, an impactor unit rotatable within said die to extrude feed mix therethrough, and a rotatable conveyor plate outside of the die to receive the extruded feed mix, an adaptor for cutting said feed mix into fragments of crumble size, said adaptor comprising a ring gear secured on said die ring, a series of cutter wheels adjacent to the outer surface of said die, a bracket for each cutter wheel rotatably mounted at one end on said conveyor plate in a position inclined to a radius of the die, means for adjusting the inclination of said bracket, a shaft in each cutter wheel journaled in the other end of said bracket, and a pinion on each shaft meshing with said ring gear for driving the cutter wheels as the conveyor plate is rotated, said pinions being so constructed and arranged as to drive said cutter wheels at peripheral speeds approximately two and one-half times their orbital speed.

References Cited in the file of this patent
UNITED STATES PATENTS

| | | |
|---|---|---|
| 2,241,546 | Evenstad et al. | May 13, 1941 |
| 2,603,170 | Meakin | July 15, 1952 |
| 2,648,296 | Oliver | Aug. 11, 1953 |